INVENTOR.
EIICHI WADA.
BY [signature]
ATTORNEY.

INVENTOR.

BY EIICHI WADA.

United States Patent Office 3,278,099

Patented Oct. 11, 1966

3,278,099

TAPE TRANSPORT MEANS FOR A MAGNETIC RECORDING AND REPRODUCING MACHINE

Eiichi Wada, Yokohama, Japan, assignor to Pioneer Kabushiki Kaisha, Tokyo, Japan Filed June 22, 1964, Ser. No. 376,740
Claims priority, application Japan, Aug. 9, 1963, 38/40,855; Dec. 4, 1963, 38/90,611
3 Claims. (Cl. 226—181)

This invention relates to tape transport means for a magnetic recording and reproducing machine.

More particularly, the present invention relates to a capstan and pinch roller assembly of a magnetic recording and reproducing machine, an object of the present invention being to provide an improved construction of the capstan and pinch roller assembly, which rotates smoothly at a moderate velocity, compared to those of conventional types.

It is another object of the present invention to provide a capstan and pinch roller assembly in a magnetic recording and reproducing machine, in which the capstan is brought to descend vertically by itself when it ceases to rotate, on account of the gravity exerted on the capstan by a belt pulley, which also acts as a flywheel and is fixed to said capstan.

It is still another object of the present invention to provide a capstan and pinch roller assembly, in a magnetic recording and reproducing machine, the construction of which is much simpler and stable compared to known capstan and pinch roller assemblies, wherein a pinch roller has to be brought down for keeping it disengaged from the tape and capstan.

It is a further object of the present invention to provide a capstan and pinch roller assembly, in a magnetic recording and reproducing machine, as above described and adapted to make it easy to mount or dismount tape spools within a magazine without damaging the tape.

These and other objects are accomplished by the structure of the invention, in which a capstan is constructed so as to descend vertically by itself, when it ceases to rotate, on account of the gravity then exerted on the capstan by a belt pulley fitted to a shaft of the capstan.

The invention will be described in detail, in conjunction with the accompanying drawings, in which.

Figure 1:
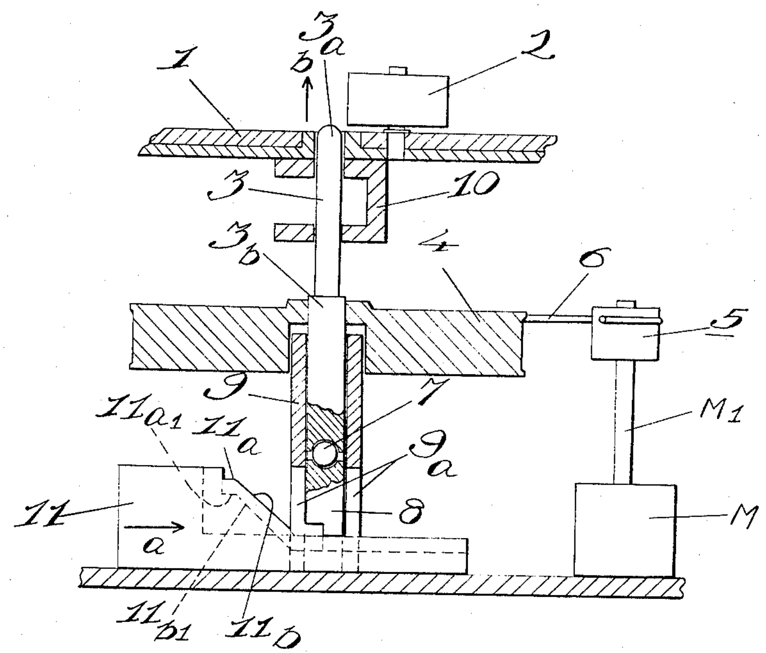
FIG. 1 is a diagrammatical vertical section view of tape transport means constructed in accordance with the invention, wherein a pinch roller is of the kind having a fixed shaft.
Figure 3:
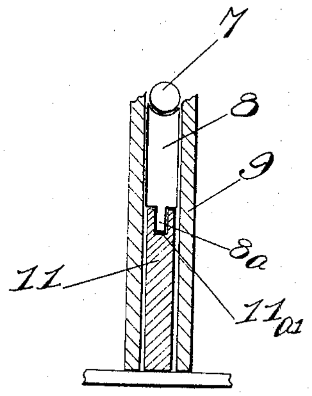
FIG. 3 is a vertical section taken on the line III—III of FIG. 2.
Figure 2:
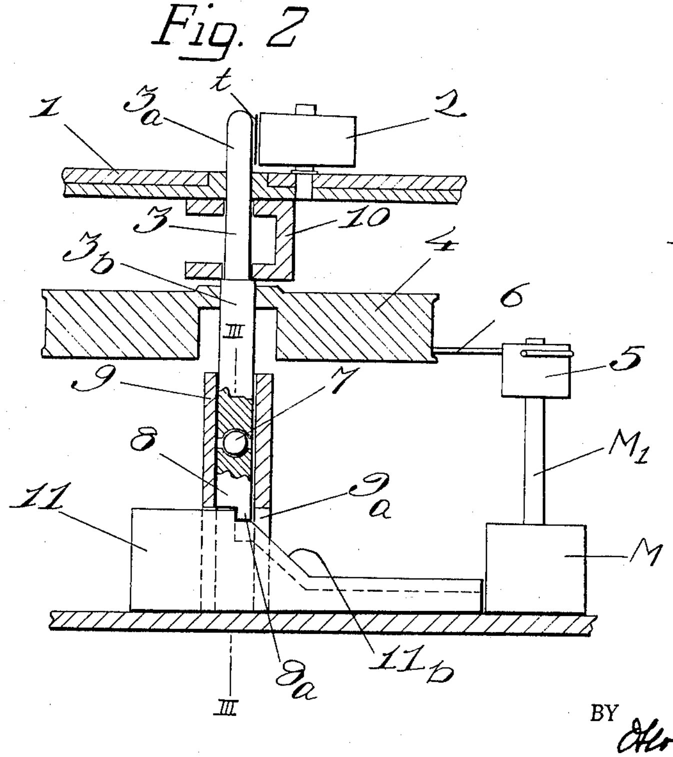
FIG. 2 is a view similar to that of FIG. 1, in which the tape transport means of FIGURE 1 is actuated.

In particular, referring to the accompanying drawings:

In FIGS. 1, 2 and 3, are illustrated respectively a tape deck 1, a pinch roller 2 and a capstan 3.

The top *3a* of the capstan 3 is rounded so that it may keep smooth contact with the tape, while the shaft portion *3b* of the capstan is fixedly equipped with a belt pulley 4, also acting as a flywheel, which is arranged to be rotated through a belt 6 by a pulley 5 fixed on the shaft $M_1$ of a motor M.

Further, the lower part of the shaft portion *3b* of said capstan 3 is received by a bearing pillar 8 through a ball 7.

Both the shaft portion *3b* and the bearing pillar 8 are inserted into a sleeve 9 having guide slots *9a*, and at the same time, the upper part of the shaft portion *3b*, that is, said capstan 3 is adapted to move vertically, without any lateral deflection, by the support of a centre guide 10.

The numeral 11 designates an actuating plate for the vertical movement of said capstan 3, which plate comprises an inclined portion 11*b* connected to a step portion 11*a*. On the step portion 11*a* and the inclined portion 11*b*, grooves $11a_1$ and $11b_1$ are provided, into which a projection *8a* formed at the lower part of said bearing pillar 8 is inserted.

In the structure above, when the actuating plate 11 is moved in the direction of the arrow *a*, and the inclined portion 11*b* engages the projection *8a*, the switch of said motor M is actuated. This causes capstan 3 to be rotated through the motor shaft $M_1$, pulley 5, belt 6 and belt pulley 4, which also acts as a flywheel. The capstan is also projected by the inclined portion 11*b* in the direction of the arrow *b*, until the step portion 11*a* engages the projection *8a*, by means of which the projection of the capstan 3 is maintained. The tape *t*, just before the capstan 3 is projected, is kept in close contact with the pinch roller 2, which is rotated by the rotation of the projected capstan.

Figure 4:
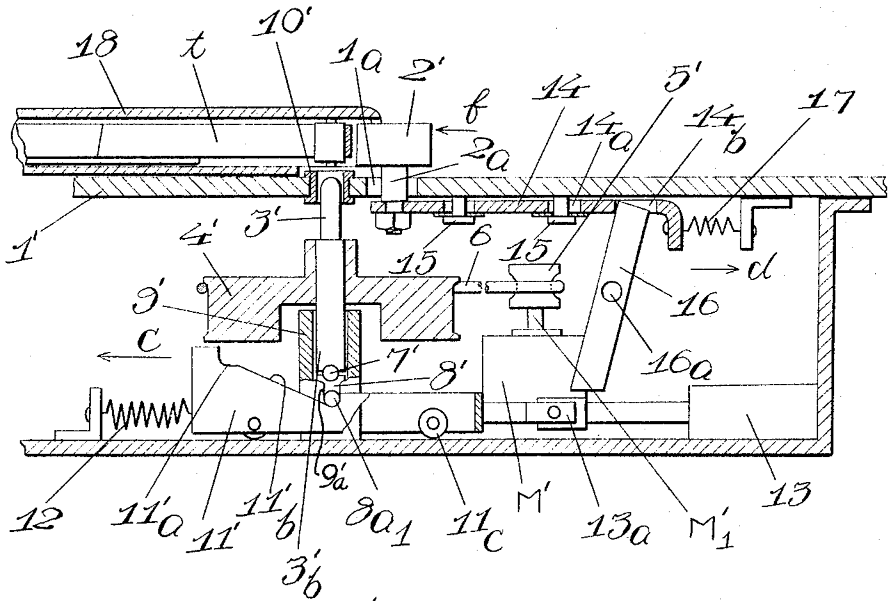
FIG. 4 and FIG. 5 are diagrammatical vertical section views of another embodiment of tape transports constructed in accordance with the invention, wherein pinch rollers are of the kind having a shaft movable in a lateral direction and tape spools are mounted within a magazine, FIGURE 5 showing the tape transport means actuated.
Figure 5:
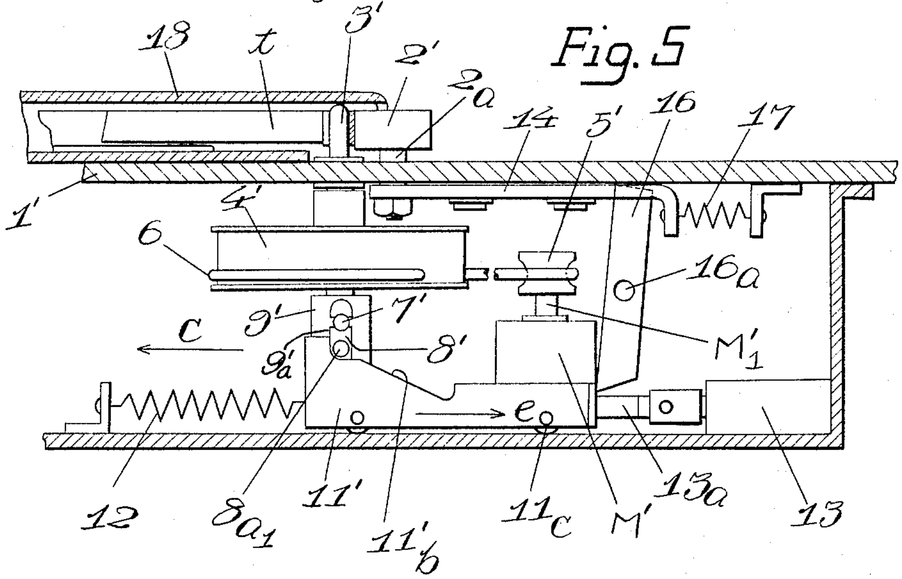

In FIGS. 4 and 5, are illustrated a tape deck 1', pinch roller 2' and capstan 3'. A belt pulley 4', which serves concurrently as a flywheel, is fixed to a shaft portion *3b'* of the capstan 3' and is arranged to be rotated through the belt 6' by the pulley 5' fixed on the shaft $M_1'$ of the motor M'. Further, the lower part of the shaft portion *3b'* of said capstan 3' is received by a bearing pillar 8' through a ball 7'. Both the shaft portion *3b'* and the bearing pillar 8' are inserted into a sleeve 9' having guide slots *9a'* as in FIG. 1, and at the same time the upper part of the shaft portion *3b'*, that is, said capstan 3' is guided vertically without any lateral deflection by the support of a centre guide 10'.

The numeral 11' designates an actuating plate for the vertical movement of said capstan 3', which plate comprises an inclined portion 11*b'* connected to the step portion 11*a'*. The inclined portion 11*b'* is slidingly in contact with the lower part of a protruding rod $8a_1$ provided on the bearing 8'.

The numeral 12 designates a spring for pulling actuating plate 11' in the direction of the arrow *c*, and a suction mechanism 13 having a plunger or the like is connected with said actuating plate 11' through a connecting rod 13*a*. The actuating plate 11' is provided with wheels 11*c* so that it may be operated smoothly.

The shaft *2a* of said pinch roller 2' is positioned in the guide hole *1a* bored through said tape deck 1', the lower part of this shaft being fixed to one end of a sliding rod 14*a*. Several guide holes 14*a* and an engaging hole 14*b* are bored through said sliding rod 14. Into the guide holes 14*a* are inserted projections 15, while at the same time the engaging hole 14*b* engages one end of an engaging rod 16, which is rotated about the fulcrum of an axis 16*a*. The other end of the rod 16 is in close impact contact with one end of said actuating plate 11'.

The numeral 17 designates a spring for pulling said sliding row 14 in the arrow *d* direction. There are also shown a tape *t* and a magazine 18 containing tape spools.

In the structure above, when said suction mechanism 13 having a plunger or the like is not in operation, the actuating plate 11' and sliding plate 14 are arranged in such a condition as shown in FIG. 4 by the action of said springs 12 and 17. Thus, the capstan 3' falls down by its own gravity, while the pinch roller 2' is separated from the tape *t*, so that the magazine 18 can be easily loaded on or off.

When operation of said suction mechanism such as the plunger or the like is desired, the actuating plate 11' is moved against said spring 12 in the arrow *e* direction.

As the plate moves, said pinch roller 2' is moved in the arrow *f* direction against the spring 17 through said engaging rod 16 and sliding rod 14, being brought into contact with the tape *t*. At the same time, the capstan 3' is raised as in FIG. 5, through the inclined portion 11*b'*, protruding rod $8a_1$, bearing 8' and ball 7'. Then said step portion 11*a'* is led to the protruding rod $8a_1$, so that the raised position of the capstan is maintained.

Conventional prior art devices, in which the capstan shaft is fixed and the pinch roller is arranged to lie down, have complicated structures accompanied by many troubles.

Whereas in the present embodiment of the invention, the capstan is vertically moved up and down as it is rotated, while the pinch roller is arranged to be moved horizontally of the tape deck, so that the pressed engagement of the capstan with the pinch roller is removed when the former moves up and down, whereby it can do the movement quite smoothly.

After the operation is stopped, the capstan goes down quickly and smoothly by means of the gravity of the flywheel 4'. Thus, the magazine can be loaded on or off without harming the tape.

Further, the present invention has other advantages in that the structure can be simplified while providing enhanced safety, as compared with the conventional prior art devices.

Various modifications may be made within the scope of the present invention.

What is claimed is:

1. A capstan and pinch roller assembly in a magnetic recording and reproducing machine comprising; a capstan having a shaft portion, the lower part of said shaft portion being supported by bearing means, the lower part of said bearing means being formed with a projection which engages an inclined portion and a step portion of an actuating plate, said shaft portion having drive means mounted thereon; and a pinch roller provided adjacent to said capstan.

2. A capstan and pinch roller assembly in a magnetic recording and reproducing machine as claimed in claim 1, wherein said projection provided on the lower part of the bearing means is positioned in sliding contact with the actuating plate on its inclined portion and step portion.

3. A capstan and pinch roller assembly in a magnetic recording and reproducing machine as claimed in claim 1, further comprising a sliding plate, said pinch roller having a shaft mounted on said sliding plate; spring means biasing said actuating and sliding plates to inoperative positions; and a mechanism adapted to move said actuating plate and said sliding plate against said spring means to bring said capstan and said pinch roller to their operative positions.

References Cited by the Examiner

UNITED STATES PATENTS

| | | | |
|---|---|---|---|
| 3,130,889 | 4/1964 | Aldridge | 226—190 X |
| 3,155,778 | 11/1964 | Meyer | 226—174 X |

FOREIGN PATENTS

| | | |
|---|---|---|
| 1,342,350 | 10/1962 | France. |

M. HENSON WOOD, Jr., *Primary Examiner.*

R. SCHACHER, *Assistant Examiner.*